J. M. ELDER & P. A. BISHOP.
Safety Bridles.

No. 138,872. Patented May 13, 1873.

Witnesses.
A. F. Cornell.
Ethan Rogers

Inventor.
James M. Elder.
P. A. Bishop.
Per Burridge & Co.
Attys.

UNITED STATES PATENT OFFICE.

JAMES M. ELDER AND PETER A. BISHOP, OF ELYRIA, OHIO.

IMPROVEMENT IN SAFETY-BRIDLES.

Specification forming part of Letters Patent No. 138,872, dated May 13, 1873; application filed February 21, 1873.

*To all whom it may concern:*

Be it known that we, JAMES M. ELDER and PETER A. BISHOP, of Elyria, in the county of Lorain and State of Ohio, have invented a certain new and Improved Safety Driving-Bridle; and we do hereby declare that the following is a full, clear, and complete description thereof, reference being had to the accompanying drawing making part of the same.

Figure 1:
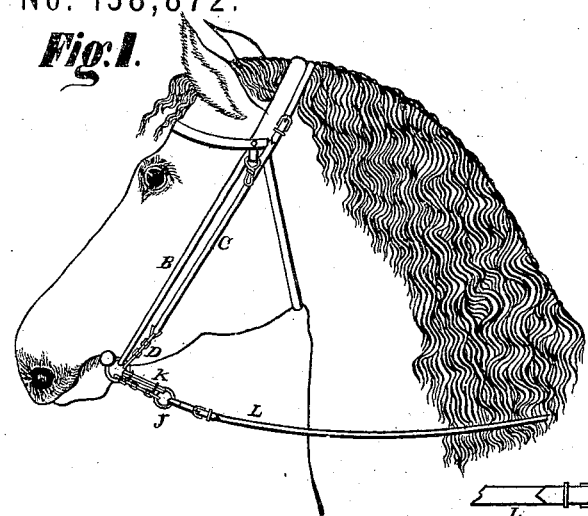
Figure 2:
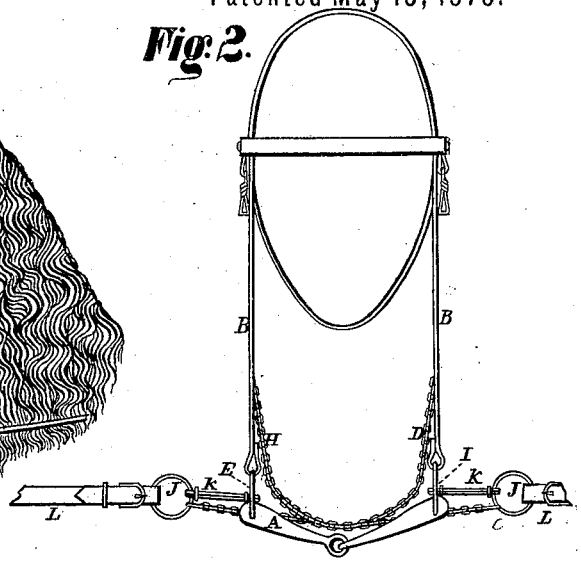
Figure 3:
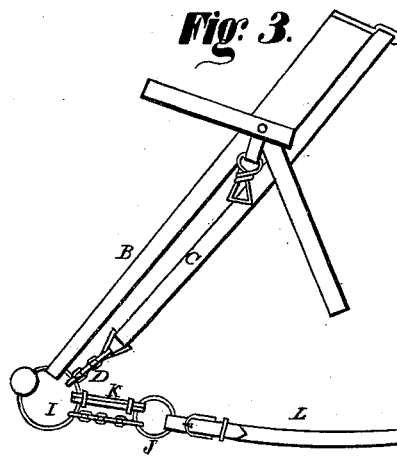
Figure 4:
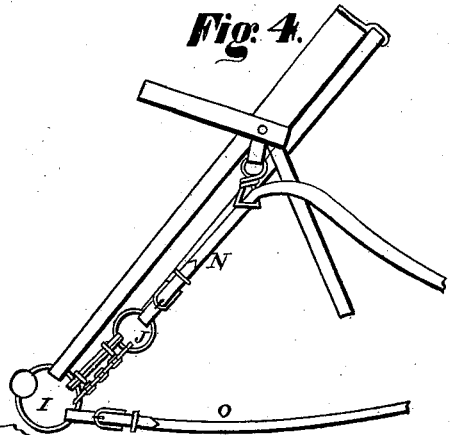

Figure 1 is a view of a horse's head having thereon the bridle. Fig. 2 is a front view of the bridle. Fig. 3 is a side view of Fig. 2. Fig. 4 is a side view, having the parts differently arranged.

Like letters of reference refer to like parts in the several views.

The nature of this invention relates to a bridle; and the object thereof is to provide a safe and reliable mouth-gear, whereby a horse can be easily and completely controlled by the driver.

Of the construction and operation of said bridle the following is a description:

A in the drawing, Fig. 2, represents the bit, which may be either jointed or not. Said bit is retained in the animal's mouth by the side straps B and brow-band and throat-latch, in the ordinary way. To the strap C is attached one end of a chain, D, from which said chain extends around to the opposite side and passes through the bit-ring E, and which is then secured to the line-ring J, as shown in Fig. 2. So also to the strap on the opposite side, corresponding to C, is attached one end of the chain H, which also extends around to the other side, passing through the bit-ring I, and attached to the line-ring J, Fig. 2. In this arrangement it will be seen that the two chains pass each other about the middle of the bit and in close proximity to it, as shown in the drawing. The line-rings J J are connected to the bit-ring E I by an elastic cord, K, and to which is also attached the driving-lines L.

The operation of the above-described safety-bridle is as follows: The chains, or that part of them by the side of the bit, are put in the animal's mouth along with the bit, in the position as shown in Fig. 2. Now, on drawing upon the driving-lines L to the extent as is done in ordinary quiet driving, no strain is exerted upon the chains more than enough to obtain to them a slight tension, the strain for guiding the animal being exerted upon the bit by the elastic cord K, which has sufficient inertness for all ordinary driving; but in the event that a strong curbing of the horse is required the elastic cord will stretch, and thereby allow the strain upon the lines to be exerted upon the chains, the result of which will be to draw them tight across the mouth, as one chain is drawn in one direction and the other in the opposite, thereby drawing the two sides of the mouth toward each other, exerting by this means a powerful pressure on the mouth, which will curb and control the animal without the assistance of the bit. On releasing the strain upon the lines the elastic cord contracts, thereby slacking the chains and allowing the strain exerted on the lines to be transferred to the bit, which, as before said, is sufficiently strong for all ordinary driving.

The curbing-chain may be used in connection with the check-lines by simply attaching the check-lines to the line rings J, as shown in Fig. 4, in which N is the check-line. In the event that this is done, the driving-lines are then attached directly to the bit-rings I, as shown in said Fig. 4, in which O represents the driving-lines.

This device of a curbing-chain is not intended for general use, but especially for hard-bitted and refractory horses, and those that have the bad habit of taking the solid bit in their teeth, and others that are liable to run away and require strong and vigorous curbing in their management.

Claim.

What we claim as our invention, and desire to secure by Letters Patent, is—

The chains H D, as arranged in relation to each other, and in combination with the lines L, bit A, and elastic cord K, substantially in the manner as and for the purpose set forth.

JAMES M. ELDER.
PETER A. BISHOP.

Witnesses:
W. H. BURRIDGE,
J. H. BURRIDGE.